(12) United States Patent
Giret et al.

(10) Patent No.: US 8,562,063 B2
(45) Date of Patent: Oct. 22, 2013

(54) DEVICE FOR CLOSING OFF AN OPENING FORMED IN THE BODYWORK OF A VEHICLE, WITH A GUIDE ELEMENT AND SLIDE FORMING A SHUTTLE, AND CORRESPONDING VEHICLE

(75) Inventors: Frédéric Giret, Bressuire (FR); Serge Gerbeau, Saint-Sauveur (FR); Jean-Claude Neaux, Terves (FR); Yvan Gerard, Trelaze (FR)

(73) Assignee: Advanced Comfort Systems France SAS—ACS France, Bressuire (FR)

( * ) Notice: Subject to any disclaimer, the term of this patent is extended or adjusted under 35 U.S.C. 154(b) by 267 days.

(21) Appl. No.: 12/747,423

(22) PCT Filed: Dec. 10, 2008

(86) PCT No.: PCT/EP2008/067264
§ 371 (c)(1),
(2), (4) Date: Sep. 7, 2010

(87) PCT Pub. No.: WO2009/074625
PCT Pub. Date: Jun. 18, 2009

(65) Prior Publication Data
US 2011/0006558 A1 Jan. 13, 2011

(30) Foreign Application Priority Data

Dec. 10, 2007 (FR) ..................................... 07 59704
May 22, 2008 (FR) ..................................... 08 53342

(51) Int. Cl.
*B60J 1/00* (2006.01)

(52) U.S. Cl.
USPC .................................................. 296/146.15

(58) Field of Classification Search
USPC ........ 296/214, 143, 216.03, 97.8, 97.11, 223, 296/97.9, 215, 97.4, 220.01, 97.1; 49/209, 49/213

See application file for complete search history.

(56) References Cited

U.S. PATENT DOCUMENTS

| 4,995,195 A | * | 2/1991 | Olberding et al. | ............... | 49/118 |
| 5,309,675 A | * | 5/1994 | Shen et al. | ..................... | 49/214 |

(Continued)

FOREIGN PATENT DOCUMENTS

| EP | 2072735 A1 | * | 6/2009 |
| FR | 2833209 A1 | | 6/2003 |

OTHER PUBLICATIONS

International Search Report and Written Opinion dated Feb. 18, 2009 for corresponding International Application No. PCT/EP2008/067264, filed Dec. 10, 2008.

(Continued)

*Primary Examiner* — Glenn Dayoan
*Assistant Examiner* — Sunsurraye Westbrook
(74) *Attorney, Agent, or Firm* — David D. Brush; Westman, Champlin & Koehler, P.A.

(57) ABSTRACT

A device is provided for closing off an opening formed in the bodywork of a motor vehicle, which includes a fixed structure in which an aperture is defined, and at least one sliding panel exhibiting a surround bearing at least two guide pegs. The device has at least one slide having a groove to accept each of the two guide pegs, the grooves being substantially identical and having an inclined portion forming an angle of between 1 and 89 DEG with the said axis of sliding; a guide element secured to the sliding panel, guided in one of the guide rails; and a return, which controls a relative movement of the slide or slides with respect to the guide element along the said axis of sliding. The sliding panel moves in a direction perpendicular to the plane of the fixed structure.

16 Claims, 10 Drawing Sheets (56) References Cited

U.S. PATENT DOCUMENTS

| | | | |
|---|---|---|---|
| 5,613,323 A * | 3/1997 | Buening | 49/380 |
| 6,920,719 B2 * | 7/2005 | Bourque et al. | 49/413 |
| 2004/0020131 A1 * | 2/2004 | Galer et al. | 49/413 |
| 2007/0234644 A1 * | 10/2007 | Jaeger et al. | 49/362 |
| 2011/0120020 A1 * | 5/2011 | Fourel et al. | 49/358 |

OTHER PUBLICATIONS

English Translation of the International Preliminary Report of Patentability and Written Opinion, dated Jul. 27, 2010 for corresponding International Application No. PCT/EP2008/067264, filed Dec. 10, 2008.

* cited by examiner

DEVICE FOR CLOSING OFF AN OPENING FORMED IN THE BODYWORK OF A VEHICLE, WITH A GUIDE ELEMENT AND SLIDE FORMING A SHUTTLE, AND CORRESPONDING VEHICLE

CROSS-REFERENCE TO RELATED APPLICATIONS

This Application is a Section 371 National Stage Application of International Application No. PCT/EP2008/067264, filed Dec. 10, 2008 and published as WO 2009/074625 on Jun. 18, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of openings of motor vehicles. More precisely, the disclosure relates to devices for closing off an opening formed in the bodywork of a vehicle, or in a door of the vehicle, and comprising a sliding mobile portion able to release or close an aperture.

BACKGROUND OF THE DISCLOSURE

Conventionally, to close off the opening of a vehicle, whether concerning an automobile, a utility vehicle, a lorry, a bus or a railroad car, a window is added, maintained by a connecting surround. The latter has an internal portion and an external wall, which simultaneously pinches the edges of the glass and of the aperture formed in the bodywork, with a seal lining.

The most widespread technique for the opening and the closing of a door window is that of rendering the latter mobile vertically in its own plane, by having it penetrate or exit the housing or the lining of the door. Horizontally sliding panels are also known, along rails formed in a surround.

This technique is commonly used today and solutions for automating it are known. Providing automobiles with electric windows is today very widespread.

This technique however has many disadvantages concerning, in particular, problems with sealing.

Another technique has been proposed by the holder of this patent application. This technique is in particular described in patent documents EP-0 778 168 and EP-0 857 844. The device for closing off (called "flush opening" in what follows) presented in these documents includes a fixed structure and a portion, or slide panel, that is mobile in relation to this fixed unit. The mobile portion is connected to the fixed unit by functional elements that provide for the required mobility and which are added on the face of the fixed portion turned towards the interior of the vehicle.

Such a flush opening can be mounted fully independently of the vehicle, and added, from the exterior, in the housing defined for this purpose on the bodywork of the vehicle. It can also be fastened, in particular by gluing to the lower portion of a door, according to the technique described in patent document EP-1 022 172. As such, most of the sealing problems identified hereinabove are resolved.

From an aesthetical standpoint, the flush opening has, viewed from the exterior, a smooth, flush aspect, due to the fact that no surround is required on the outline of the aperture formed in the fixed unit.

In order to provide a sliding of the mobile portion, constituted in general by a transparent panel, a guide device is provided for example comprising a first and second guide rails fixedly mounted on the fixed unit (or fixed structure) of the opening, on either side of the aperture closed by the mobile panel. The latter is mounted on the rails, in order to slide for example according to a longitudinal direction, in a plane of sliding between one (or several) opening positions and an intermediary clearing position wherein it is across from the opening and cleared from the latter.

Note that it has been considered to displace the mobile portion between the closing off position and the intermediary clearing position according to two techniques primarily:

a first technique for which the displacement of the mobile portion is a combination of a movement in a direction parallel to the plane of the fixed portion and of a movement in a direction perpendicular to this plane, in the form of a general wandering movement, according to which the distal edge of the mobile portion is located, at the end of travel, in the plane of the opening (the mobile portion then being "across", between the plane of closing off and the plane of sliding). It is then sufficient to bring the proximal edge, for example manually, in order to provide for the closing off; and a second technique for which the mobile portion remains constantly in a plane that is substantially parallel to the plane of the fixed portion during its displacement.

The invention relates more particularly to this second technique of closing off, to its alternatives and its perfections. More precisely, the inventors are aiming via this document to propose at least one new technique for guiding and for locking such "flush openings". However, the invention can in a wider manner apply to all devices for closing off of which the opening and/or closing kinematics includes a displacement (in y) between an opening position and an intermediary clearing position, in a plane parallel to the plane of the fixed unit, and a displacement (in x) in this parallel plane.

It is known, for example from FR-2 833 209 of the same Applicant as this application, a guiding technique for a mobile panel of "flush opening" in rails implementing guiding pegs circulating in non-straight grooves formed in rails.

A disadvantage of this technique is that the implementation of the rails is complex.

Another disadvantage of this technique is that the rails are sometimes of substantial thickness in order to allow for the guiding of the pegs satisfactorily, which can interfere with the transparency of the opening.

Moreover, with regards to the locking operation of the flush openings, several solutions have been proposed to lock the sliding panel(s) in the closing off position of the aperture provided in the opening, and where applicable in selected positions of opening.

Among the latter, a technique is known shown in EP-1 659 247, according to which at least one bolt cooperating with a strike plate is provided formed in one of the rails perpendicularly to the axis of sliding of this rail, the passing from a locked position to an unlocked position resulting from the displacement of the sliding panel from a first plane towards a second plane substantially in the direction perpendicular to the axis of the rail.

A disadvantage of these techniques of the prior art is that it requires to proceed with an effort, for example a tightening effort, in order to immobilise the panel in a locked position, which is not practical and is sometimes not very effective. This moreover renders these techniques complex, since it is necessary to provide additional means of blocking in order to effectively lock the sliding panel.

Another disadvantage of these techniques of prior art is that they do not permit, or do not offer a simple or effective solution, for stopping the sliding of the panel in any total or intermediary opening position.

SUMMARY

An aspect of the present disclosure relates to a device for closing off an opening formed in the bodywork of an automobile vehicle, comprising a fixed structure wherein an aperture is defined, and at least one sliding panel having a surround bearing at least two guiding pegs, mobile in relation to said fixed structure between:

- a closing off position of said aperture, in the plane formed by said fixed structure; and
- a sliding position, in a plane of sliding that is substantially parallel to said plane formed by said fixed structure, said fixed structure bearing, on its face turned towards the interior of said vehicle, at least one guide rail of said sliding panel, defining an axis of sliding.

According to an embodiment of the invention, such a device for closing off comprises:

- at least one slide having a groove to accept each of said guiding pegs, said grooves being substantially identical and having an inclined portion forming an angle between 1 and 89° with said axis of sliding;
- a guide element fastening to said sliding panel, guided in one of said guide rails; and
- a return which controls a movement relative to the said slide(s) in relation to said guide element according to said axis of sliding, in such a way as to allow for a displacement of said sliding panel according to a direction that is perpendicular to the plane of said fixed structure.

As such, such a device proposes, in a new and inventive manner, to fasten the sliding panel directly to a guide element and to at least one slide, by the intermediary of guiding pegs, guided in a simple-form rail path, substantially straight, in order to provide for its setting in mobility in the direction of the axis of sliding or perpendicularly to the plane of the fixed structure.

Note that the term "plane" must be understood here in a wide sense: the plane formed by the opening is sometimes curved, according to one, or even two, directions (this further justifies, in certain cases, the term "substantially").

This device therefore advantageously makes it possible to place the sliding panel on an enlarged surface of the rail, by the intermediary of the sliding element and of the slide and to implement rails of reduced thickness corresponding substantially to the thickness of the slide or of the sliding element and/or to the thickness provided for the gluing of the rail on the fixed structure.

Moreover, thanks to the grooves for accepting of the device according to an embodiment of the invention, the sliding panel can be displaced in relation to the plane of the fixed structure be remaining constantly parallel to this plane, and the inclined portions of these grooves make it possible for the transition between a sliding position and the closing off position of the panel to take place progressively, without an abrupt change in direction.

The angle can in particular be of a magnitude of 45°, which makes it possible to offset, or inversely bring closer, the sliding panel in relation to the plane of the fixed structure, when it is across from the aperture, according to a direction perpendicular to this plane, which has an advantage from an aesthetical standpoint.

Preferentially, said guide element overlaps at least one portion of said slide.

As such, the space occupied by the mobile portions of the device for closing off is reduced in the direction of the axis of sliding.

In at least one embodiment of the invention, said return means include a coiled spring mounted between said guide element and said slide and extending in parallel to said axis of sliding.

Other return means can also be considered, such as for example a spiral spring, a leaf spring, etc.

Advantageously, said rail comprises at least one locking strike plate, able to cooperate with one of said guiding pegs in said closing off position.

As such the slide panel can be locked in the closing off position without shearing the seals of the sliding panel.

Note that in other embodiments of the invention, the strike plate can be separate from the rail and/or strike plates can be provided on each of the two rails, arranged across from one another.

According to an advantageous aspect of an embodiment of the invention, such a device comprises a handle fastened to said slide(s), and mobile in relation to said surround.

As such, the slide(s) can be easily manoeuvred or displaced, housed in inside the rails, in relation to the surround.

Preferentially, said handle is mobile in a direction parallel to said axis of sliding.

As such the handle and the slides to which it is fastened can be displaced in a straight rail path oriented according to the axis of sliding. Moreover, the movement of the sliding panel in relation to the handle is facilitated during the passage of the sliding panel from the closing off position to the sliding position, wherein it is displaced according to the direction perpendicular to the plane of the fixed structure, since the handle is not free to move in this latter direction.

According to an advantageous embodiment of the invention, said handle connects an upper slide, mobile in an upper guide rail, and a lower slide, mobile in a lower rail.

As such, a symmetric device is obtained.

According to a preferential aspect of an embodiment of the invention, as said guiding pegs are not housed in said strike plates, said guiding pegs rub against an edge of said rail when the handle is not actuated.

As such, the sliding panel can be immobilised simply and effectively in any intermediate sliding position by releasing the handle, the friction of the guiding pegs along the rail preventing the sliding of this panel.

According to a particular aspect of an embodiment of the invention, said handle comprises a masking cover of the space between said handle and said surround of said sliding panel.

As such, only the second surround is visible from the interior of the vehicle, which improves the aesthetical effect linked with the sliding of the panel.

Preferentially, said handle and said slide(s) define a second surround superposed on said surround.

As such, the device is simplified.

According to a particular aspect of an embodiment of the invention, said second surround comprises at least one hole associated with each of said guiding pegs in such a way as to allow for the driving of the sliding panel according to a direction perpendicular to the plane of said fixed structure, and means for fastening with said guide element.

Advantageously, said surround comprises at least one retaining element able to bear against an internal face of said rail in such a way as to prevent the tilting of said surround around an axis perpendicular to the plane of said sliding panel.

It can in particular be provided to arrange a retaining element of substantial extension or two retaining elements at each end of the edge of the surround across from one of the rails in such a way as to allow a greater functional spacing between the retaining element(s) and this rail.

It can furthermore be considered to motorise the displacement of the sliding panel between the closing off position and said sliding position and/or the actuating of the handle.

According to a particular aspect of an embodiment of the invention, a device such as described hereinabove can include for this purpose means of motorisation of said sliding panel. As such, the passing of the sliding panel from the closing off position to the sliding position (opening of the panel) can be controlled remotely, and vice-versa.

Advantageously, said device includes a cable fastened to at least one edge of said surround and actuated by a gear motor, a portion of said cable being substantially parallel to said axis of sliding, and means of controlling the variation of the unwound length of said cable.

As such, the power of the gear motor to be implemented is limited and the space occupied by the means of motorisation is reduced. On the other hand, the displacement of the sliding panel perpendicularly to the plane of the fixed structure is allowed by the releasing of an additional length of cable.

In at least one particular embodiment of the invention, said or said guide rails define an arc of a circle, in such a way as to guide said sliding panel by pivoting around a pivot axis perpendicular top said plane of sliding, in said sliding position, said or said slides and said guide element having a curved profile corresponding substantially to the curvature of said rails.

An embodiment of the invention further relates to an automobile vehicle comprising at least one device for closing off an opening such as described hereinabove.

BRIEF DESCRIPTION OF THE DRAWINGS

Other characteristics and advantages shall appear more clearly when reading the following description of a preferred embodiment, provided by way of a non-restrictive example for the purposes of illustration, and of the annexed drawings, among which.

DETAILED DESCRIPTION OF ILLUSTRATIVE EMBODIMENTS

1. Description of a Particular Embodiment

As already indicated, the general principle of the present disclosure is based in particular on the implementation of at least one drive slide of two guiding pegs fastened to the sliding panel and of a guide element of the panel guided according to the axis of the rail, and mobile in relation to one another in order to allow for the displacement of the sliding panel in the direction perpendicular to the plane of the fixed structure.

Figure 1A:
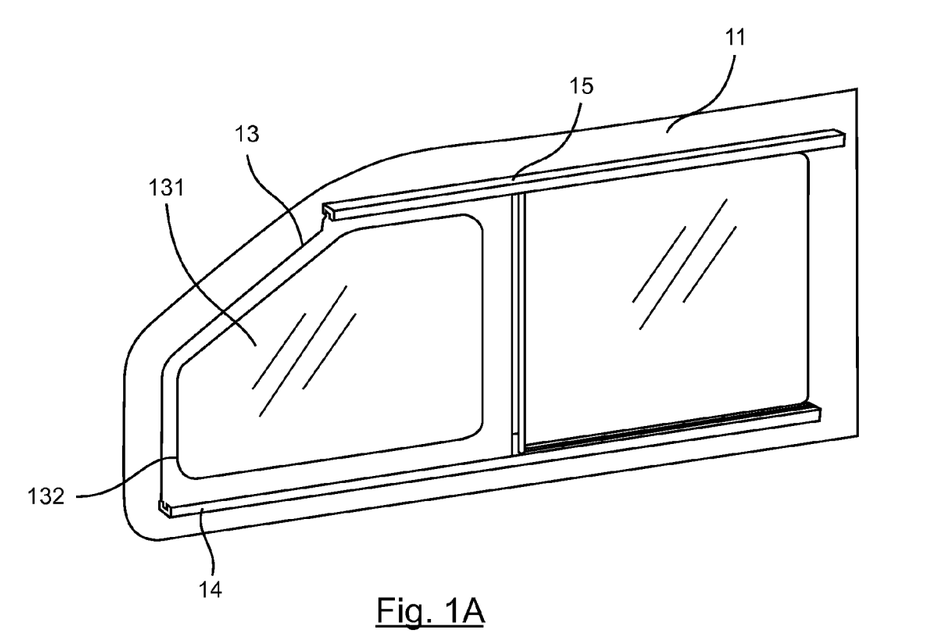
FIGS. 1A and 1B show, in a perspective representation, an embodiment of a device for closing off according to an embodiment of the invention respectively in closing off position of the aperture and in a partial opening position.
Figure 1B:
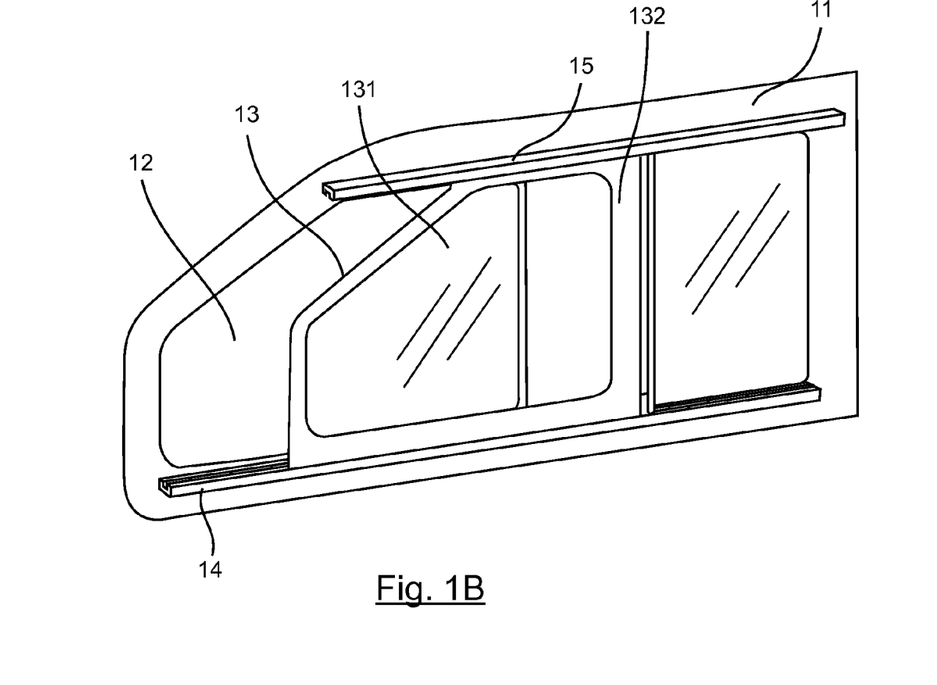

FIGS. 1A and 1B show, in a perspective view, an embodiment of a device with manual aperture, intended to close off an opening formed in a lateral wall of the bodywork of a vehicle. This device for closing off comprises a fixed structure 11 made of transparent material, still referred to as fixed unit or fixed panel, wherein is pierced an aperture 12, and a sliding panel 13 mobile in relation to this fixed structure, making it possible to completely close off the aperture (see FIG. 1A), and provided to slide and release this aperture partially (see FIG. 1B) or totally.

The sliding panel comprises a window 131 provided with a surround 132, that can be guided along two substantially parallel rails 14 and 15, mounted on the interior face of the fixed structure 11 respectively in the lower portion and in the upper portion.

Figure 2:
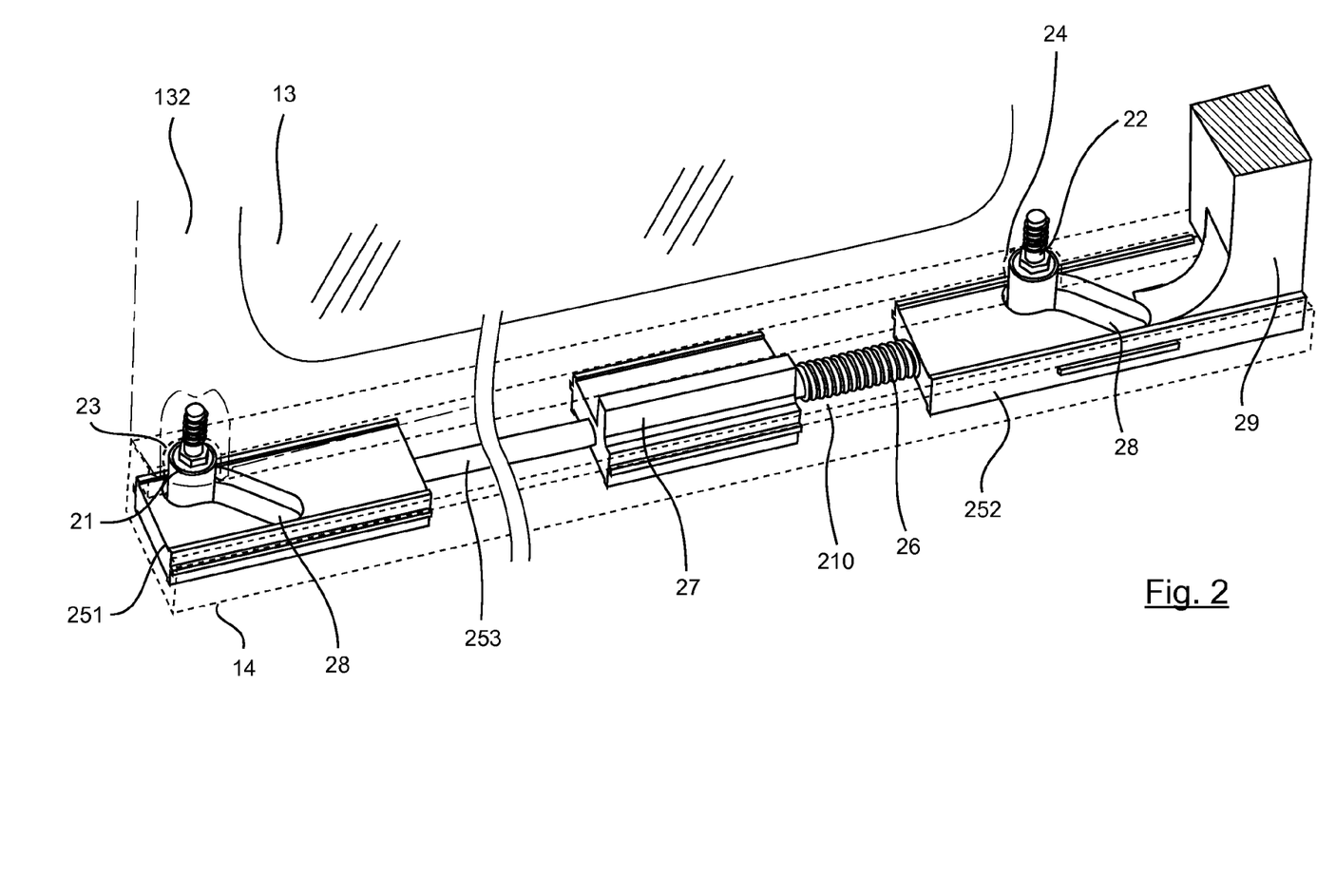
FIG. 2 is a detailed view of the lower portion of the device for closing off shown in FIGS. 1A and 1B.

FIG. 2 shows the detail of the lower portion of the device for closing off shown in FIG. 1A in closing off position, wherein the surround 132 of the sliding panel and the rail 14 are shown as dotted lines, with the upper portion able to be deduced via simple symmetry.

The sliding panel 13 has in its lower portion two guiding pegs 21 and 22, fixed to the surround 132 in this embodiment of the invention. In the closing off position of the aperture represented in this figure, the pegs 21 and 22 cooperate with two identical cross strike plates 23 and 24 formed in the thickness of the rail 14 in order to provide for the locking of the sliding panel 13.

Figure 3:
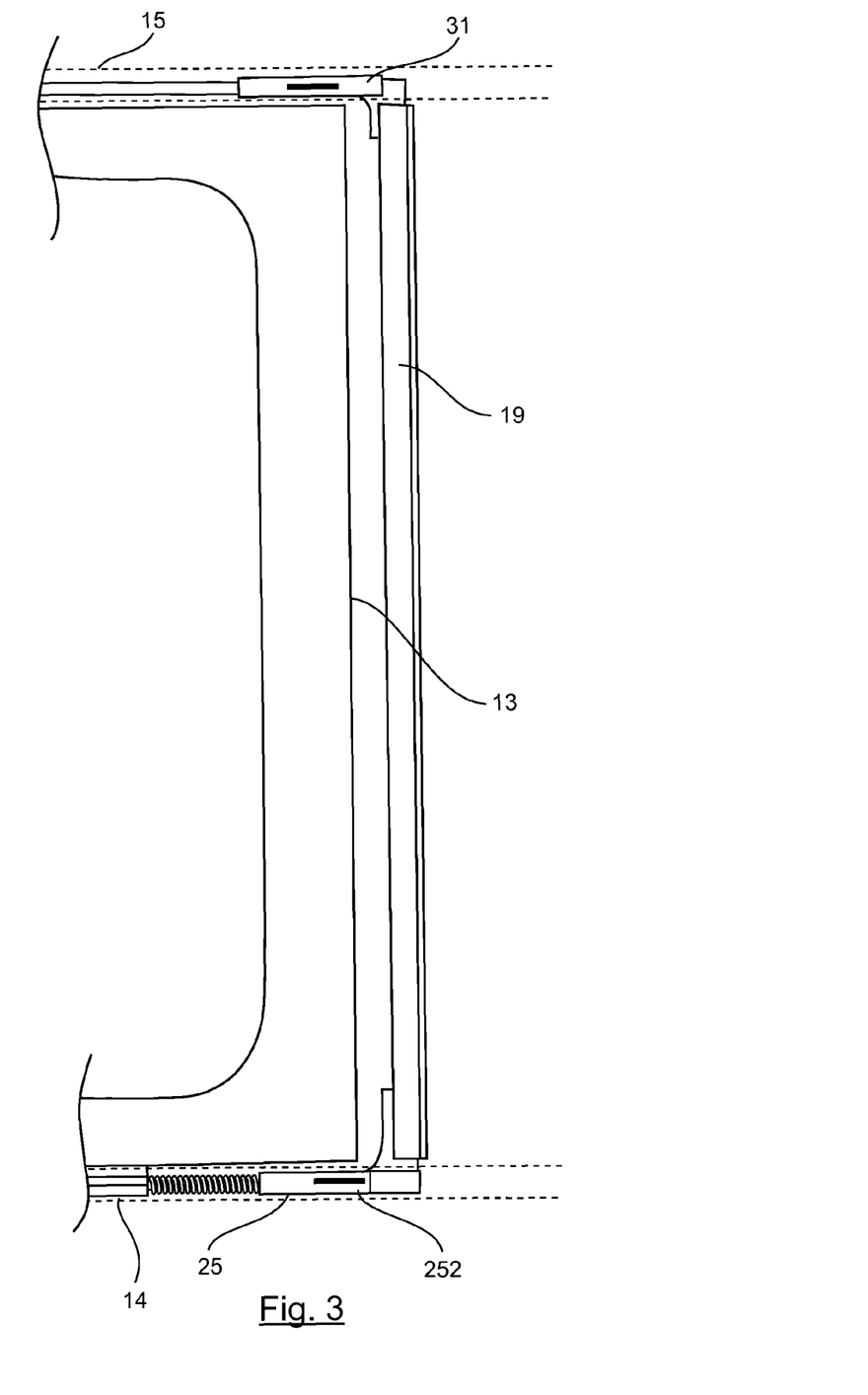
FIG. 3 shows the fastening of the handle with the lower and upper slides of the device in FIGS. 1A and 1B.

A slide 25, forming a shuttle across from the position of the sliding panel 13, is housed in the internal slide rail of the rail 14, substantially in alignment with the sliding panel. It comprises two guide pads 251 and 252, rigidly connected by a connecting bar 253. The pad 252 is fastened to a handle 29. It extends along the vertical edge of the surround 132 and connects the lower slide 25 to the upper slide 31 (see FIG. 3), mobile in the rail 15, through a straight groove 210 oriented according to the axis of the rail 14, communicating at a right angle with the strike plates 23 and 24. In such a way as to facilitate its grasping, it has substantially in its central portion an ergonomic grasping zone.

A coiled return spring 26, mounted around the bar 253, is housed between the pad 252 of the slide and an element 27 fastened to the surround 132.

Figure 4:
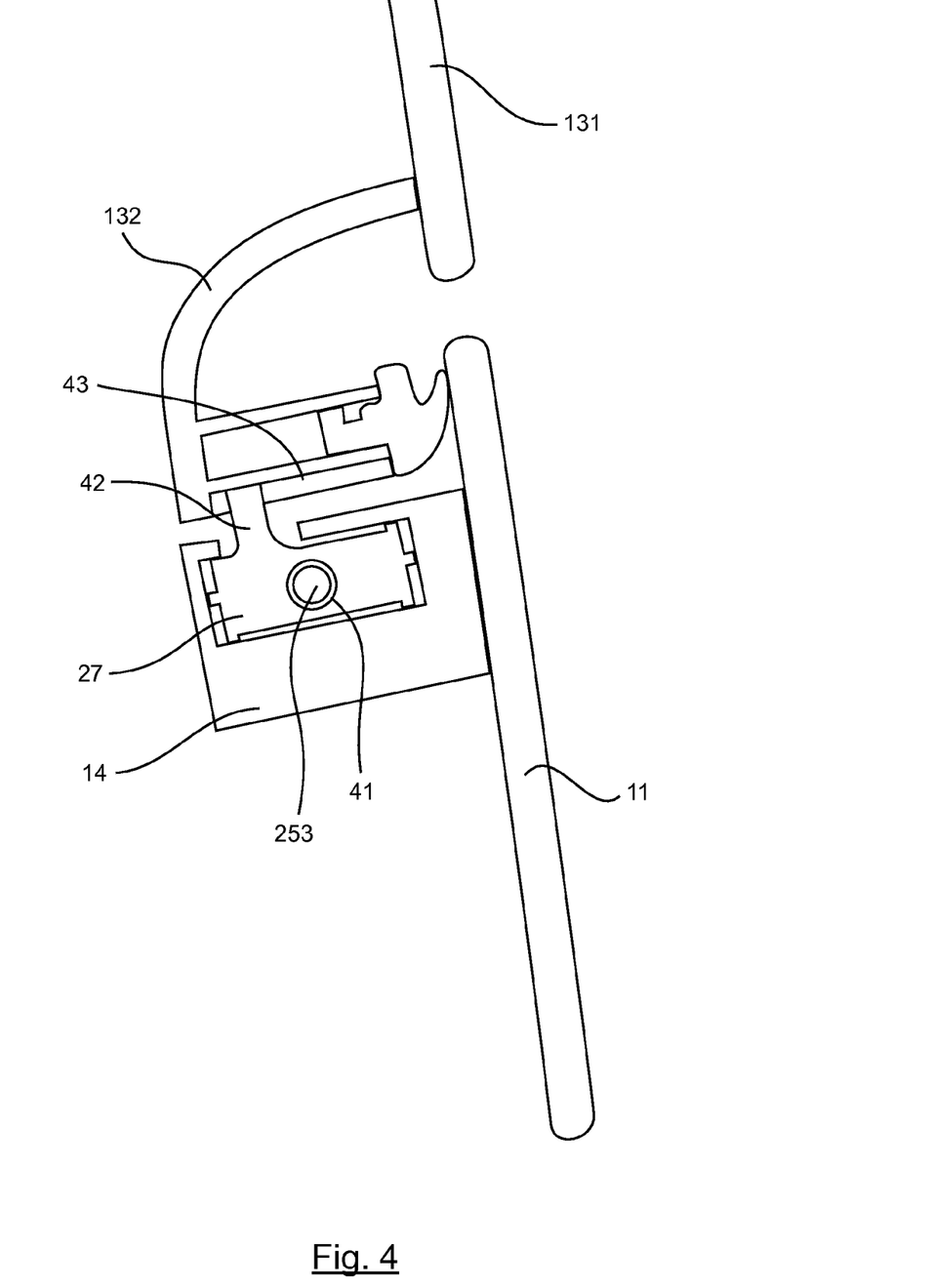
FIG. 4 is a cross-section view of the fastening of the element fastened with the surround of the sliding panel of the device shown in FIGS. 1A and 1B.

This element 27 mobile in relation to the bar 253, that it overlaps, can slide in the slide rail of the rail 14. As shown in a cross-section view in FIG. 4, it comprises an orifice 41 to slide freely along the bar 253 and a lug 42 mobile in a groove 43 of the surround 132 according to the direction perpendicular to the plane of the sliding panel 13, preventing it from sliding in the rail, when the panel is not free to slide according to the direction of the axis of the rail 14.

A guide groove 28 is formed in each of the pads 251, 252 in order to receive the base of each peg 21, 22, exiting under the strike plate.

In the position shown in FIG. 2, the handle 29 is released. The action of the spring 26 has pushed the pad 252 towards the right, the bottom of the groove 28 coming to stop on the pegs 21, 22. Each peg 21, 22 is then immobilised, the exit of the strike plate being arranged perpendicularly to the direction of circulation in the groove.

FIGS. 5 to 8 show, in a top view of the zone of the pad 251, the successive positions occupied by the peg 21 when the panel 13 is displaced, by actuating the handle 29 manually, from the closing off position to a sliding position, after having been cleared from the plane of the fixed structure 11.

Figure 5:
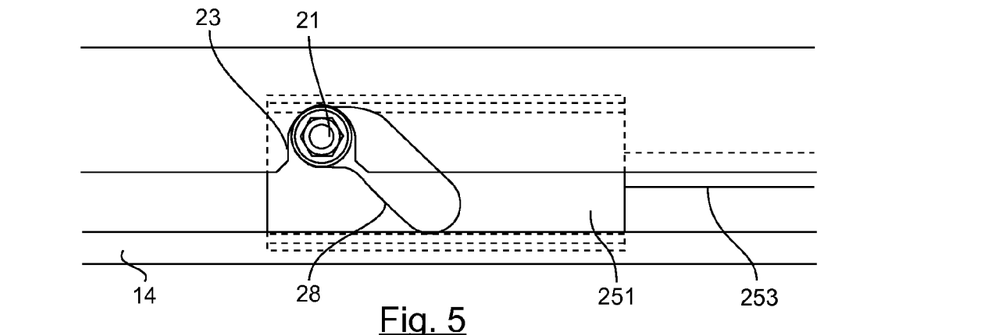
FIGS. 5 to 8 are successive view of the top of the zone of the pad of the lower slide of the device shown in FIGS. 1A and 1B when the sliding panel of the devices in FIGS. 1A and 1B is driven from the closing off position to an intermediary sliding position.

In FIG. 5, the panel 13 is in the closing off position of the aperture and the sliding element 21 is housed in the strike plate 23. The handle having been pressed towards the left according to the axis of the rail 14, is displaced in the rail 14 and the groove 210, and has pushed the pad 252, and therefore the pad 251, in this same direction by compressing the spring 26 which is blocked against the element 27 fastened to the panel 13. During the first phase of displacement of the pad 25, the peg 21, remaining immobile, is located at the end of the straight portion turned towards the exterior 41 of the groove 28, as shown in FIG. 5, and can then be released from the strike plate 23.

Figure 6:
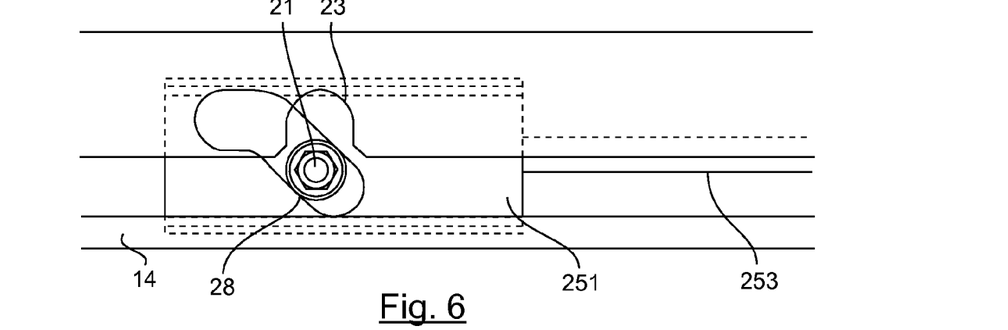
Figure 7:
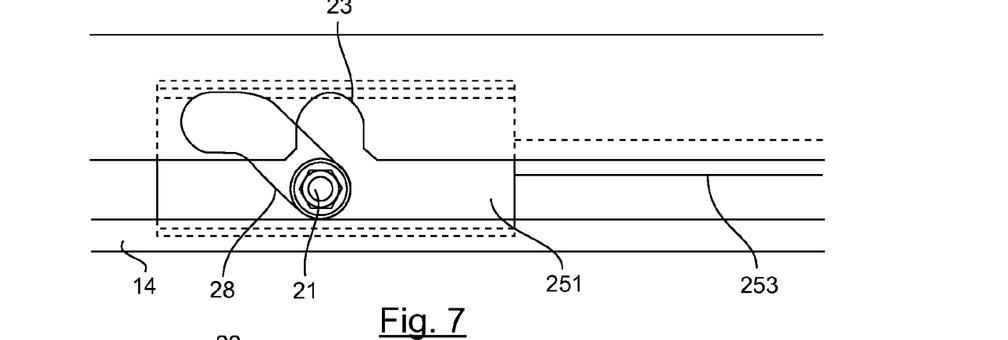

When starting from the position shown in FIG. 5, the pad 251 progresses towards the left, the peg 21 which is guided in the inclined portion by an angle of 45° in relation to the axis of the rail of the groove 28, is extracted from the strike plate 23 and is progressively pushed towards the interior of the vehicle, as shown successively in FIGS. 6 and 7.

Note that due to the particular choice of an angle of the inclined portion equal to 45°, the pegs 21 and 22 are displaced in the direction perpendicular to the plane of the fixed structure, by driving the panel 13, which provides the clearing movement of the sliding panel an appreciable aesthetical effect. The element 27 thus remains maintained immobile by the panel 13 in the rail 14, which makes it possible to displace the panel without any jolting, by progressively increasing the intensity of the pressure on the handle.

In alternatives of this embodiment, it can however be considered to provide an angle between 1° and 89° and different from 45° for the inclined portion of the groove.

In the position shown in FIG. 7, the peg 21 has reached the second end of the groove 28 and is fully out of reach of the strike plate. The panel 13 is then completely cleared from the plane of the fixed structure and can be pulled towards the right, by driving the element 27 and the slide 25, in a sliding movement according to the axis of the rail, ensuring that the handle is maintained pressed.

Figure 8:
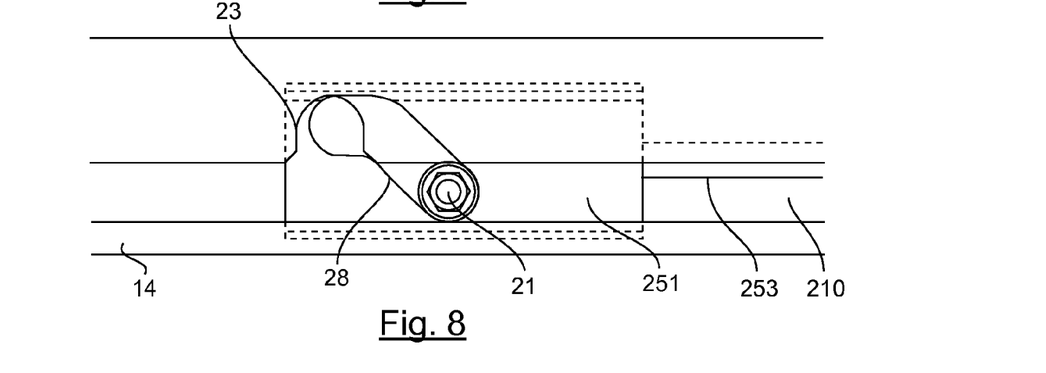

An intermediary sliding position is shown in reference to FIG. 8. The peg 21 is maintained in contact with the second end of the groove under the action of the handle and slides in the groove 210. The releasing of the handle 29 has for immediate effect to release the spring 26 which will push the pad 251 towards the right by pressing the peg 21 on the exterior edge of the groove 210. The panel 13 is then immobilised, and advantageously maintained in a stable manner in this position by the friction of the peg on the edge of the groove.

Figure 9A:
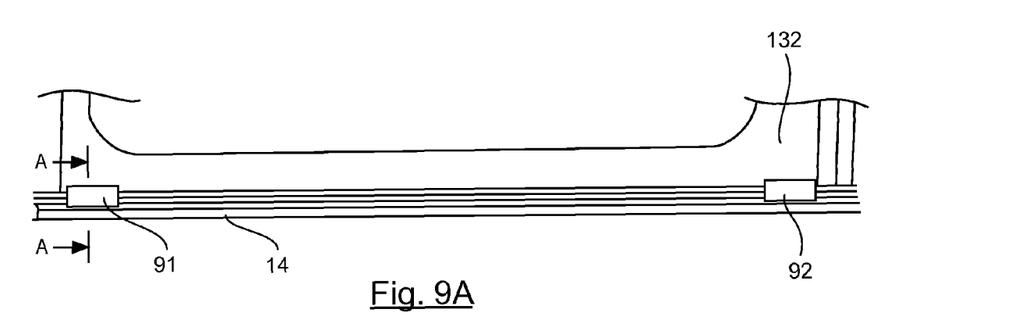
FIGS. 9A and 9B show the detail of the retaining system preventing the tilting of the sliding panel of the device in FIG. 1, respectively in a front view and according to a transversal section.
Figure 9B:
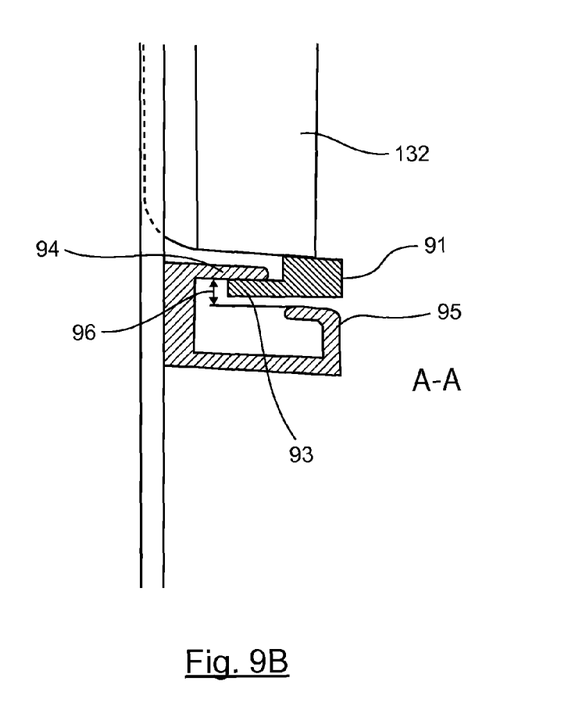

FIGS. 9A and 9B show respectively in a front view and in a cross-section view, the retaining means able to prevent the tilting of the surround 132 around an axis perpendicular to the plane of the sliding panel 13, during the sliding of the latter.

These retaining means include two retaining elements 91, 92 fixed to the ends of the lower edge of the surround 132, as shown in FIG. 9A. These elements 91, 92 have an "L" shape of which the horizontal portion 93 (see FIG. 9B) comes to bear against the internal face 94 of the rail 14. The rail 14 is shaped in order to allow for the passing of the portion 93 of the elements 91, 92 between the internal face 94 and the edge 95 turned towards the interior of the vehicle. A functional spacing 96 is provided in order to limit the displacement of the panel 13 downwards and as such prevent the tilting, while still allowing the sliding of the elements 91, 92.

In an alternative of this embodiment, a single retaining element can also be provided extending over a substantial portion of the lower edge of the surround. In yet another alternative, it can be considered to also provide the upper edge of the surround with retaining means with the upper rail.

2. Description of Another Particular Embodiment

Figure 12:
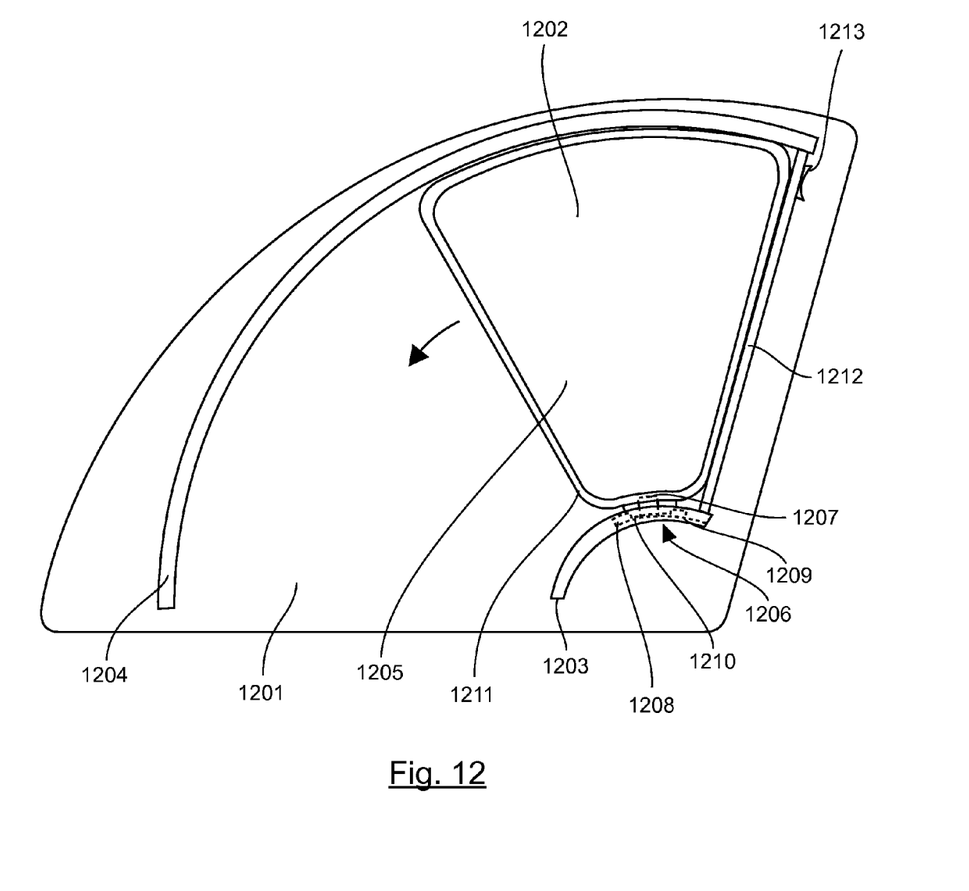
FIG. 12 is a representation of an embodiment of the invention wherein the fixed structure bears two concentric guide rails in arc of a circle in order to allow for a pivoting of the sliding panel during its sliding.

Another embodiment of the invention is shown in reference to FIG. 12 (shown in closing off position), wherein the fixed panel 1201, wherein is formed an aperture 1202, is mounted on the vehicle for example as a replacement for a conventional quarter glass.

This fixed panel 1201, of which the edges are free from any surround, in such a way as to be directly fastened to the bodywork of the vehicle, from the exterior of the latter, for example using a glue seal in the same manner as would be carried out for a fixed window.

As can be seen in FIG. 12 of the interior of the vehicle, this fixed panel 1201 bears, seen from the interior of the vehicle two concentric guide rails 1203 and 1204, each defining an arc of a circle.

These rails 1203 and 1204 allow for the guiding in pivoting of the sliding panel 1205, in the plane of sliding parallel to the plan defined by the fixed panel 1201. They are sufficiently separated from the edges of the fixed panel 1201, in order to not interfere with its gluing on the edges of the bodywork. However, connecting elements and/or water draining elements can be associated to these rails, and extend beyond the glue seal, substantially to an edge of the fixed panel, according to techniques known per se.

The edges of the fixed panel 1201 are moreover preferentially covered with a silk-screen, aimed at concealing, from the exterior, the edges of the bodywork, as well as the rails 1203 and 1204.

The locking and the displacement in pivoting of the sliding panel 1205 is provided manually, in this embodiment of the invention. In alternatives of this embodiment, it can also be provided to motorise the locking and the displacement of the sliding panel.

The kinematics of this panel 1205 comprise on the one hand a displacement in sliding in the rails 1203 and 1204, and on the other hand a displacement of closing/opening according to an axis that is substantially perpendicular to the plane of sliding, in order to come in a closed position in the plane defined by the fixed panel 1201.

In the embodiment shown, the two movements are provided, in the lower portion, using a slide 1206 forming a shuttle of a guide element 1207 fastened to the surround 1211 of the sliding panel 1205, circulating in an internal slide rail of the lower rail 1203 between wherein is mounted a return spring.

The slide 1206 is constituted of two pads 1208 and 1209 connected by a connecting bar 1210, and wherein are formed guide grooves provided to receive the base of two guiding pegs (not shown in this FIG. 12) fixed to the lower edge of the surround 1211 of the panel 1205. These guide grooves each have an inclined portion of an angle equal to 45° in relation to the direction of the internal slide rail of the rail.

In order to facilitate the sliding and the rotation of the mobile panel, the two pads 1208 and 1209, the connecting bar 1210 and the guide element 1207 have a curved profile corresponding substantially to the radius of curvature of the rail 1203.

In alternatives of this embodiment of the invention, it can also be considered to provide substantially straight pads and/or a guide element, in the case where their length remains less than 15% radius of curvature of the rails.

The sliding panel can be locked in closing off position by immobilisation of the guiding pegs in strike plates formed in the rail 1203.

A single handle 1212, mounted mobile in relation to surround 1211 and fastened to the pad 1209, cooperates with this pad in order to control the displacement of the sliding panel 1205 and/or its locking or its unlocking, by modifying the relative position of the slide 1206 and of the guide element 1207, according to the general principle already explained hereinabove. This handle furthermore advantageously has a grasping zone 1213 arranged ergonomically on the upper portion of its right edge, in the vicinity of the rail 1204, in order to allow the occupants of the vehicle to manoeuvre the sliding panel 1205, by exerting a reduced effort.

3. Other Characteristics and Advantages

Other alternatives of this embodiment can of course be considered without departing from the scope of the invention.

As such, in an alternative embodiment of the invention, the handle can include a masking cover of the space separating it from the surround of the sliding panel.

Figure 10:
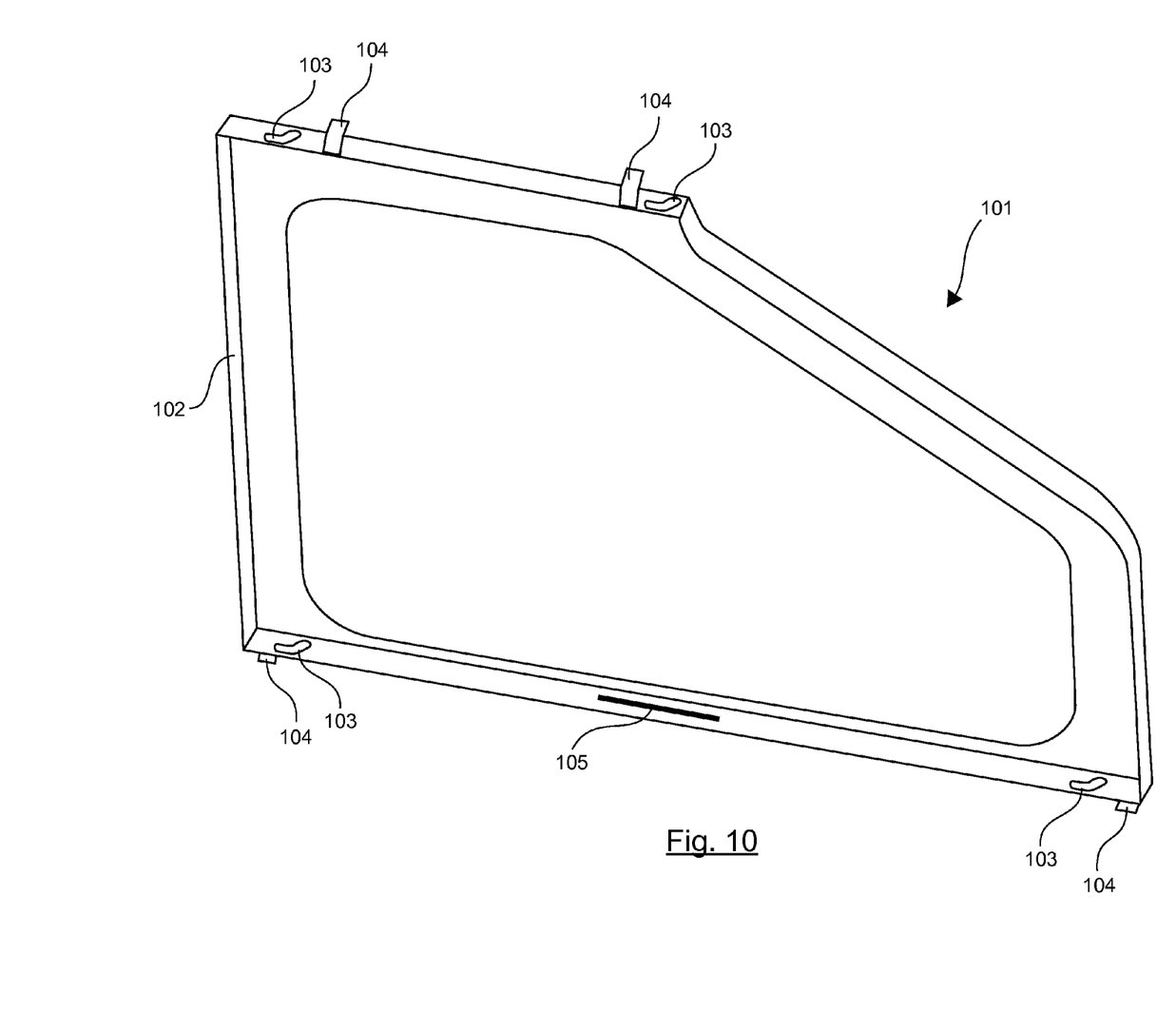
FIG. 10 is a representation of another embodiment of the invention, wherein the handle is incorporated into a second surround.

In another alternative embodiment of the invention, illustrated in FIG. 10, the handle can define a second surround 101 superimposing itself on the surround of the sliding panel. This second surround which has a general shape close to that of the surround of the sliding panel, is advantageously designed to incorporate the features of the handle and of the slides. As such it comprises a lateral edge 102 forming a handle and in its lower and upper portions and holes 103, substantially identical, including a straight portion communicating with an inclined portion, for the guiding of the pegs of the sliding panel. It further comprises flexible supports 104 intended to allow the surround to rest in the rails, by separating its edges from the bottom of the rails and as such render the holes 105 effective, and a straight guide rib on the upper face of the lower edge whereon the element fastened to the sliding panel is intended to rest.

In yet another alternative embodiment of the invention, it can be provided to motorise the actuating of the handle and/or the displacement of the sliding panel. Motorised means of actuating, such as a device with drive cables driven in both directions of sliding by a gear motor can also be considered.

In this case, it is suitable to provide orientation grooves symmetrically opposite those shown for the embodiment detailed hereinabove, in order to allow for the clearance of the sliding panel from the plane of the fixed structure, and inversely to replace it in this plane, by pulling towards the right, respectively pushing towards the left, the handle (arranged in this embodiment to the left of each lower and upper pad), to then slide the sliding panel towards the right in the direction of the aperture, respectively towards the left in the direction of the closing, in the same movement of traction of the sliding panel towards the right, or respectively of pushing towards the left.

Figure 11A:
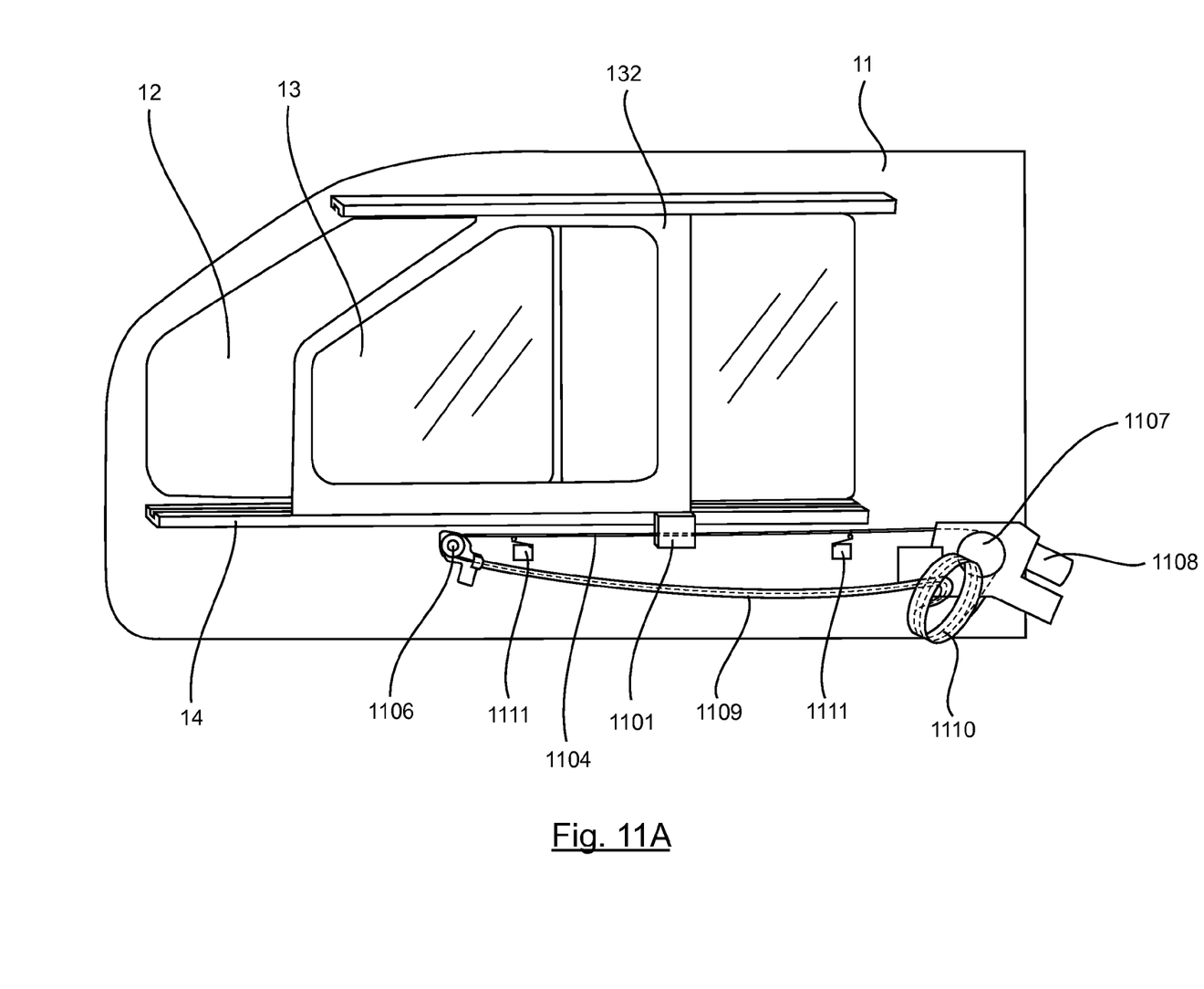
FIGS. 11A and 11B show another embodiment of the invention wherein the sliding panel is motorised, respectively according to a general view of the device for closing off, according to a detailed view of the zone of the drive unit of the surround of the sliding panel.

An example of the implementation of a motorising of a sliding panel 13 is presented in reference to FIG. 11A.

In order to displace the sliding panel 13, a drive unit 1101 is fixed to the surround 132 of this panel, under the lower portion of the surround 132. The movement of the unit 1101 is controlled by a gear motor 1108, via a drive cable 1104.

In this embodiment of the invention, the unit 1101 is arranged near the axis of sliding, substantially at the height of the lower rail 14. This arrangement makes it possible to limit the power required of the gear motor and therefore correlatively the space occupied by this gear motor. The unit 1101 is moreover offset from the plane of the sliding panel by a distance at least equal to the width of the rail 14, in order to not strike the rail 14 during the movement of the sliding panel.

The cable 1104 has the form of a closed loop. Its upper portion is maintained taught horizontally between a pulley 1106 (fixed on the fixed structure, to the left of the unit 1101) and a pulley 1107 mounted on the shaft of a gear motor 1108 (fixed on the fixed structure 11, to the right of the unit 1101). As such, when the cable 1104 is pulled by the gear motor towards the right or pushed towards the left, the latter drives the unit 1101, and therefore the sliding panel 13, which accompany its sliding movement.

The lower portion for the return of the loop of the cable 1104 is inserted into a semi-rigid sheath 1109 between the pulley 1106 and an automatic winder 1110 associated to the gear motor in order to maintain the cable tight permanently.

The movement of the upper portion of the drive cable 1104 towards the left or towards the right is transmitted simply to the unit 1101, and therefore to the sliding panel 13, by the intermediary of a ring 1103 crimped on this portion of the drive cable 1104, which is inserted in a semi-cylindrical groove 1102 of the unit 1101, of complementary shape, and is maintained tight therein.

On the other hand, the displacement of the sliding panel perpendicularly to the plane of the fixed structure, from the closing off position to a sliding position, after having been cleared from the plane of the fixed structure, or vice-versa, is advantageously made possible by the release of an additional length of cable from the automatic winder 1110, intended to control the variation in the unwound length of cable.

Figure 11B:
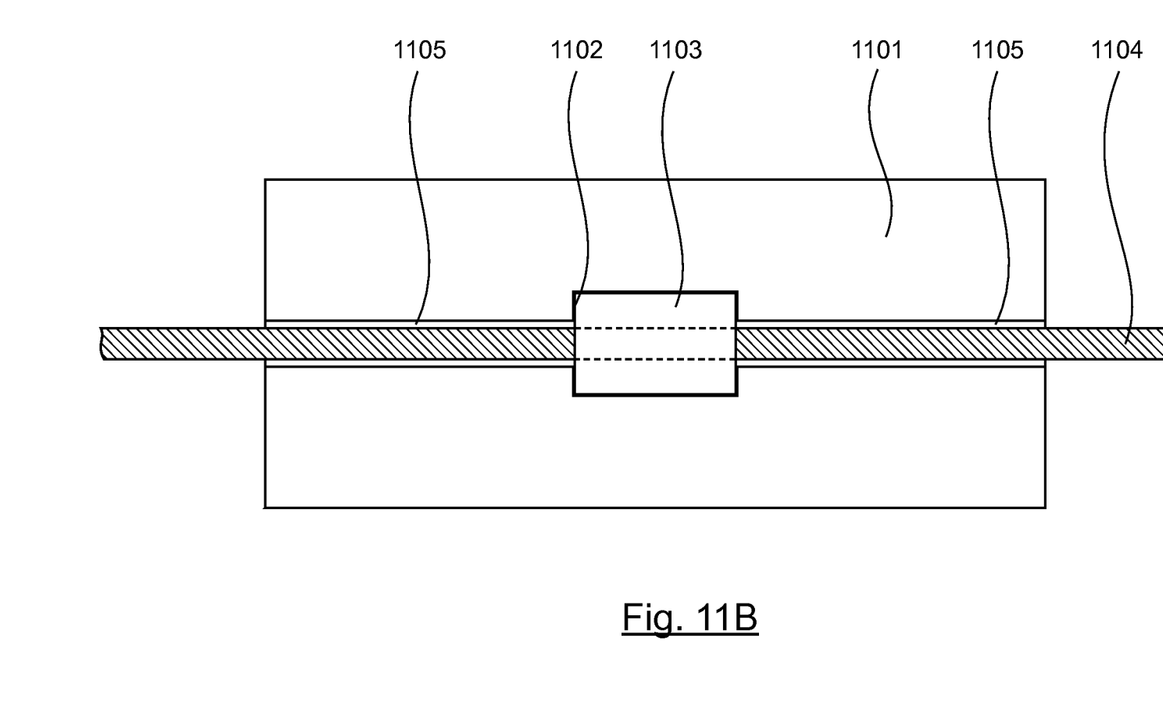

As can moreover be seen in FIG. 11B, in a top view of the unit 1101, this unit further has along its entire length an exiting groove 1105 making it possible to leave the passage at the upper portion of the loop of the cable 1104, in such a way as to maintain it in this embodiment substantially parallel to the axis of sliding of the sliding panel and to the lower rail 14 (i.e. substantially horizontal).

In an alternative of this embodiment, it can also be considered to tighten the upper portion of the cable according to a horizontal direction inclined in the annular direction of the inclined portions of the grooves of the slide, in relation to the direction of the axis of sliding. This constructive measure can be suitable to facilitate the passing from the closing off position to the sliding position, or inversely.

Two travel limiters 1111, operating on the principle of an electrical switch, make it possible to cut off the electrical supply of the gear motor when the sliding panel reaches an extreme opening position (right limiter), or closing (left limiter). As such, the gear motor does not force when the sliding panel comes to bear in the closing off position or in maximum position of aperture.

In an alternative of this embodiment, it can also be provided electronic means and/or means of detecting an overcurrent of the value of the torque required to cut off the electrical supply of the gear motor when the sliding panel reaches one or the other of the extreme sliding positions (closing off position and full opening position). In yet another embodiment of the invention, it can also be considered to provide the upper edge of the aperture formed in the device for closing off, with electronic means of detection and or to provide a seal in an adapted form in order to detect the presence of a finger, of an object, etc. in the aperture when the automatic closing of the aperture by the motorised sliding panel is actuated. This can in particular prevent the risks that an occupant of the vehicle, and in particular a child, pinches one or several fingers between the surround of the sliding panel and an edge of the aperture, when the sliding panel is repositioned automatically in the closing off position.

An embodiment of the present invention proposes a technique for setting in mobility a sliding panel of a device for closing off an opening according to the directions x (according to the length of the vehicle) and y (according to the width of the vehicle) of the same plane (without offset in z (according to the height of the vehicle)), which makes it possible to simplify the locking and unlocking operations of the latter in closed position and in any opening position.

An embodiment of the present invention provides such a device of which the rails are of simple form and can therefore be manufactured easily and at least cost.

An embodiment of the present invention provides such a device for closing off of an opening which makes possible a reliable sliding and without effort and of which the manoeuvre can easily and effectively be motorised.

As such, an embodiment of the present invention provides such a device, which makes it possible to easily control the sliding of the mobile panel, regardless of the direction of displacement (opening or closing), while still retaining safeties pertaining to its manipulation, by a young child for example.

An embodiment of the present invention provides such a device for closing off an opening which provides a complete countersinking of the panel into the opening during the closing manoeuvre.

An embodiment of the present invention provides such as device for closing off an opening that is simple to mount on a door or on a wall of a vehicle, and which allows for easy and reliable use.

An embodiment of the present invention provides such a device for closing off an opening which retains all of the advantages of "flush openings" already developed by the holder of this application, and in particular:

flush aesthetic aspect;
aerodynamic aspects;
facility and reduced manufacturing cost;
facility and reduced assembly cost.

Although the present disclosure has been described with reference to one or more examples, workers skilled in the art will recognize that changes may be made in form and detail without departing from the scope of the disclosure and/or the appended claims.

The invention claimed is:

1. A device for closing off an opening formed in the bodywork of an automobile vehicle, comprising a fixed structure defining an aperture therein, and at least one sliding panel having a surround bearing at least two guiding pegs and being mobile in relation to said fixed structure between:
   a closing off position of said aperture, in a plane formed by said fixed structure; and
   a sliding position, in a plane of sliding substantially parallel to said plane formed by said fixed structure,
   said fixed structure bearing, on its face turned towards an interior of said vehicle, at least one guide rail of said sliding panel, defining an axis of sliding,
   wherein the device comprises:
   at least one slide forming a shuttle movable along said at least one guide rail, said slide having a groove to accept each of said guiding pegs, said grooves being substantially identical and having an inclined portion forming an angle between 1 and 89° with said axis of sliding;
   a guide element fastened to said sliding panel, guided in one of said guide rails; and
   a return, which controls a relative movement of said at least one slide in relation to said guide element according to said axis of sliding, and
   wherein said device allows for a displacement of said sliding panel according to a direction perpendicular to the plane of said fixed structure.

2. The device for closing off according to claim 1, wherein said guide element overlaps at least one portion of said slide.

3. The device for closing off according to claim 1, wherein said return includes a coiled spring mounted between said guide element and said at least one slide and extending in parallel to said axis of sliding.

4. The device for closing off according to claim 1, wherein said rail comprises at least one locking strike plate which cooperates with one of said guiding pegs in said closing off position.

5. The device for closing off according to claim 1, wherein the device comprises a handle fastened to said at least one slide, and mobile in relation to said surround.

6. The device for closing off according to claim 5, wherein said handle is mobile in a direction parallel to said axis of sliding.

7. The device for closing off according to claim 5, wherein said handle connects an upper slide, mobile in an upper guide rail, and a lower slide, mobile in a lower rail.

8. The device for closing off according to claim 5, wherein as said guiding pegs are not housed in said strike plates, said guiding pegs rub against an edge of said rail when the handle is not actuated.

9. The device for closing off according to claim 5, wherein said handle comprises a masking cover for the space between said handle and said surround of said sliding panel.

10. The device for closing off according to claim 9, wherein said handle and said at least one slide define a second surround superimposed on said surround.

11. The device for closing off according to claim 10, wherein said second surround comprises at least one hole associated to each of said guiding pegs in such a way as to allow for the driving of the sliding panel -according to a direction perpendicular to the plane of said fixed structure, and means for fastening with said guide element.

12. The device for closing off according to claim 1, wherein said sliding panel is motorized.

13. The device for closing off according to claim 12, wherein the device includes a cable, fastened to at least one edge of said surround and actuated by a gear motor, a portion of said cable being substantially parallel to said axis of sliding, and means of controlling variation of an unwound length of said cable.

14. The device for closing off according to claim 1, wherein said surround comprises at least one retaining element able to bear against an internal face of said rail in such a way as to prevent the tilting of said surround around an axis perpendicular to the plane of said sliding panel.

15. The device for closing off according to claim 1, wherein said at least one guide rail defines an arc of a circle, in such a way that said sliding panel is displaced by pivoting.

16. An automobile vehicle having an opening formed in its bodywork, wherein the vehicle comprises:
- at least one device for closing the opening, said device for closing off comprising:
- a fixed structure defining an aperture therein;
- at least one sliding panel having a surround bearing at least two guiding pegs and being mobile in relation to said fixed structure between:
  - a closing off position of said aperture, in a plane formed by said fixed structure; and
  - a position of sliding, in a plane of sliding substantially parallel to said plane formed by said fixed structure,
- said fixed structure bearing, on its face turned towards an interior of said vehicle, at least one guide rail of said sliding panel, defining an axis of sliding;
- at least one slide forming a shuttle movable along said at least one guide rail, said slide having a groove to accept each of said guiding pegs, said grooves being substantially identical and having an inclined portion forming an angle between 1 and 89° with said axis of sliding;
- a guide element fastened to said sliding panel, guided in one of said guide rails; and
- a return which controls a relative movement of said at least one slide in relation to said guide element according to said axis of sliding, wherein said device allows for a displacement of said sliding panel according to a direction perpendicular to the plane of said fixed structure.

* * * * *

UNITED STATES PATENT AND TRADEMARK OFFICE
CERTIFICATE OF CORRECTION

PATENT NO. : 8,562,063 B2  Page 1 of 1
APPLICATION NO. : 12/747423
DATED : October 22, 2013
INVENTOR(S) : Giret et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

Signed and Sealed this

Fifteenth Day of September, 2015

Michelle K. Lee
*Director of the United States Patent and Trademark Office*